May 10, 1960 R. A. NOLAND ET AL 2,936,363
APPARATUS AND METHOD FOR ARC WELDING
Filed Jan. 27, 1956 4 Sheets-Sheet 4

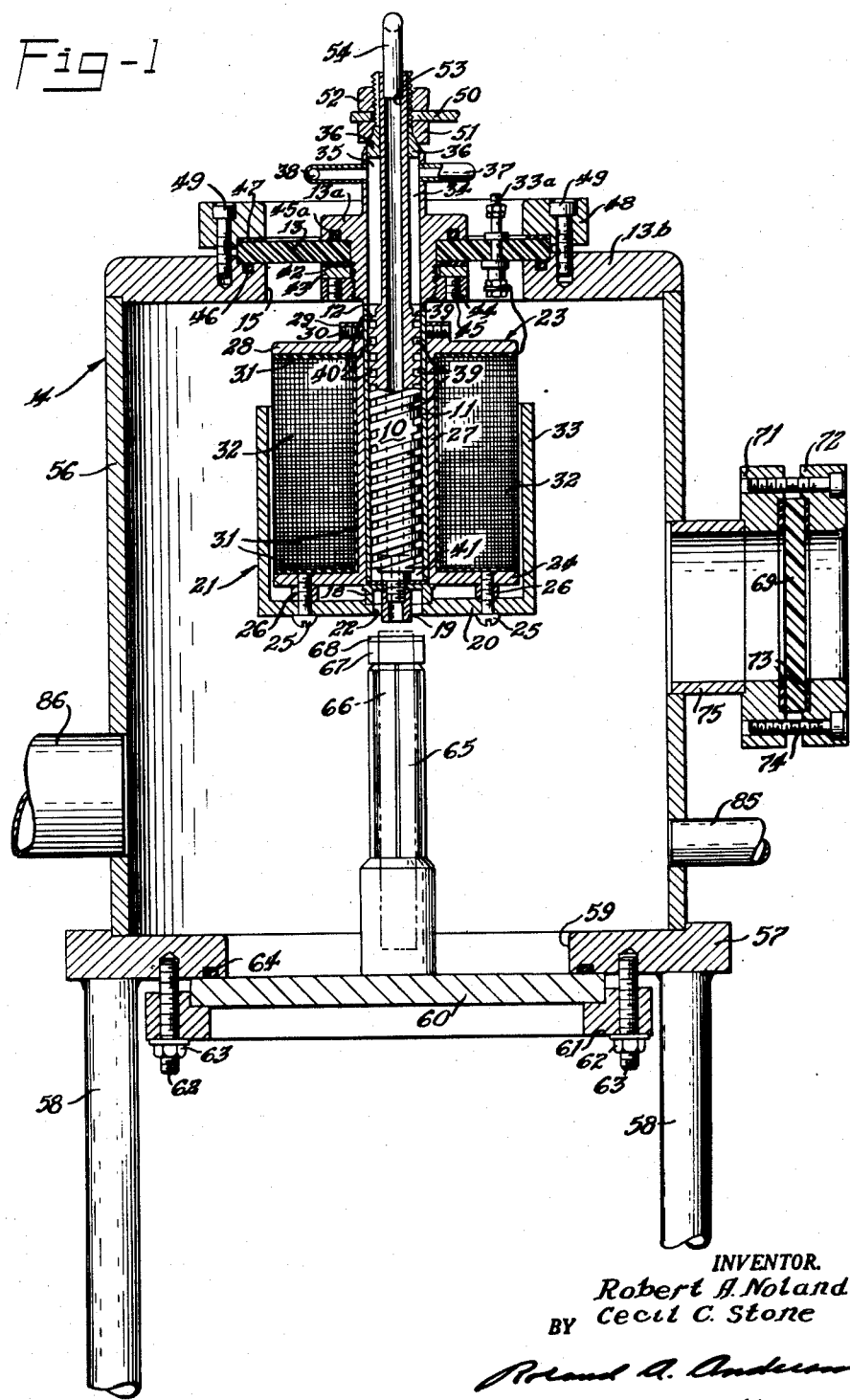

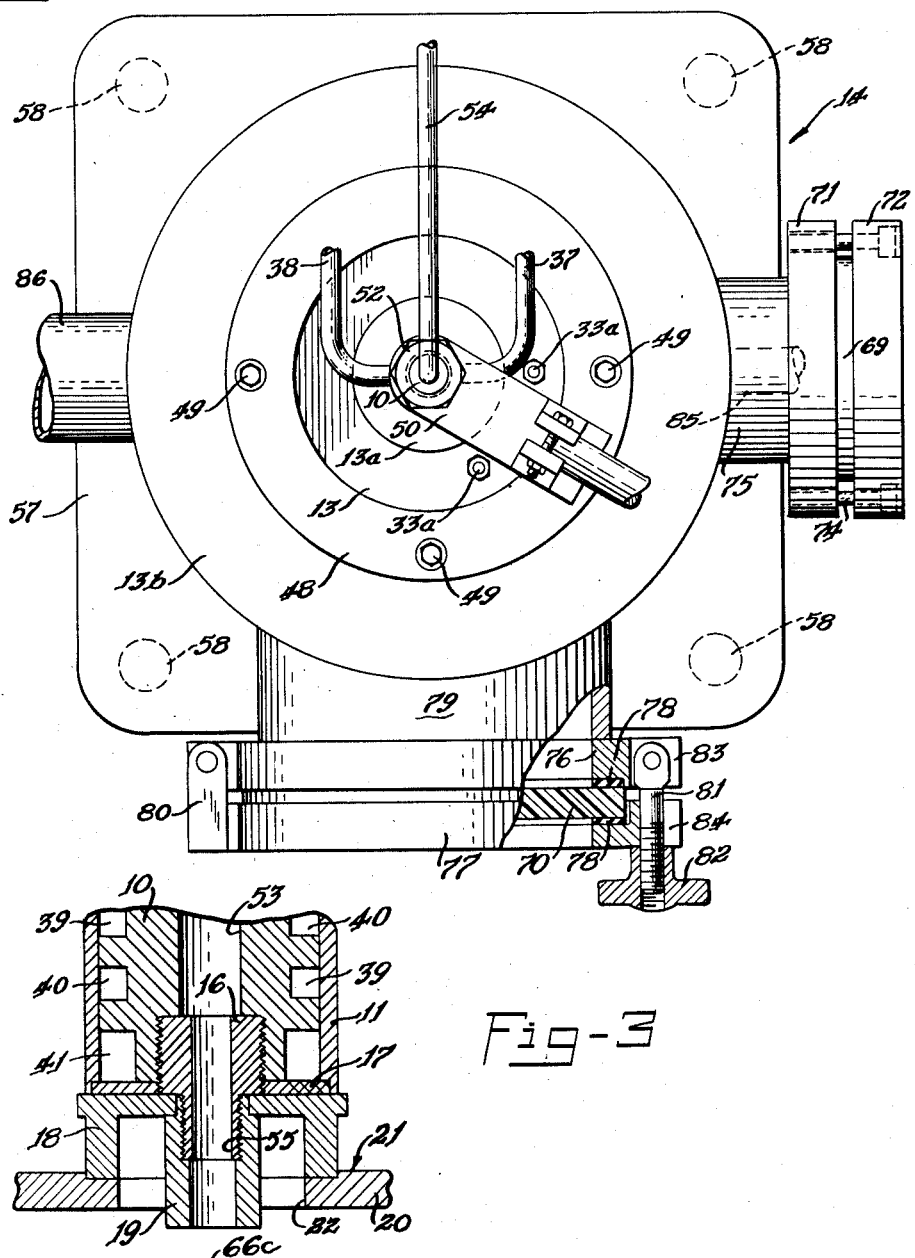
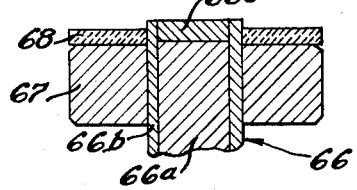

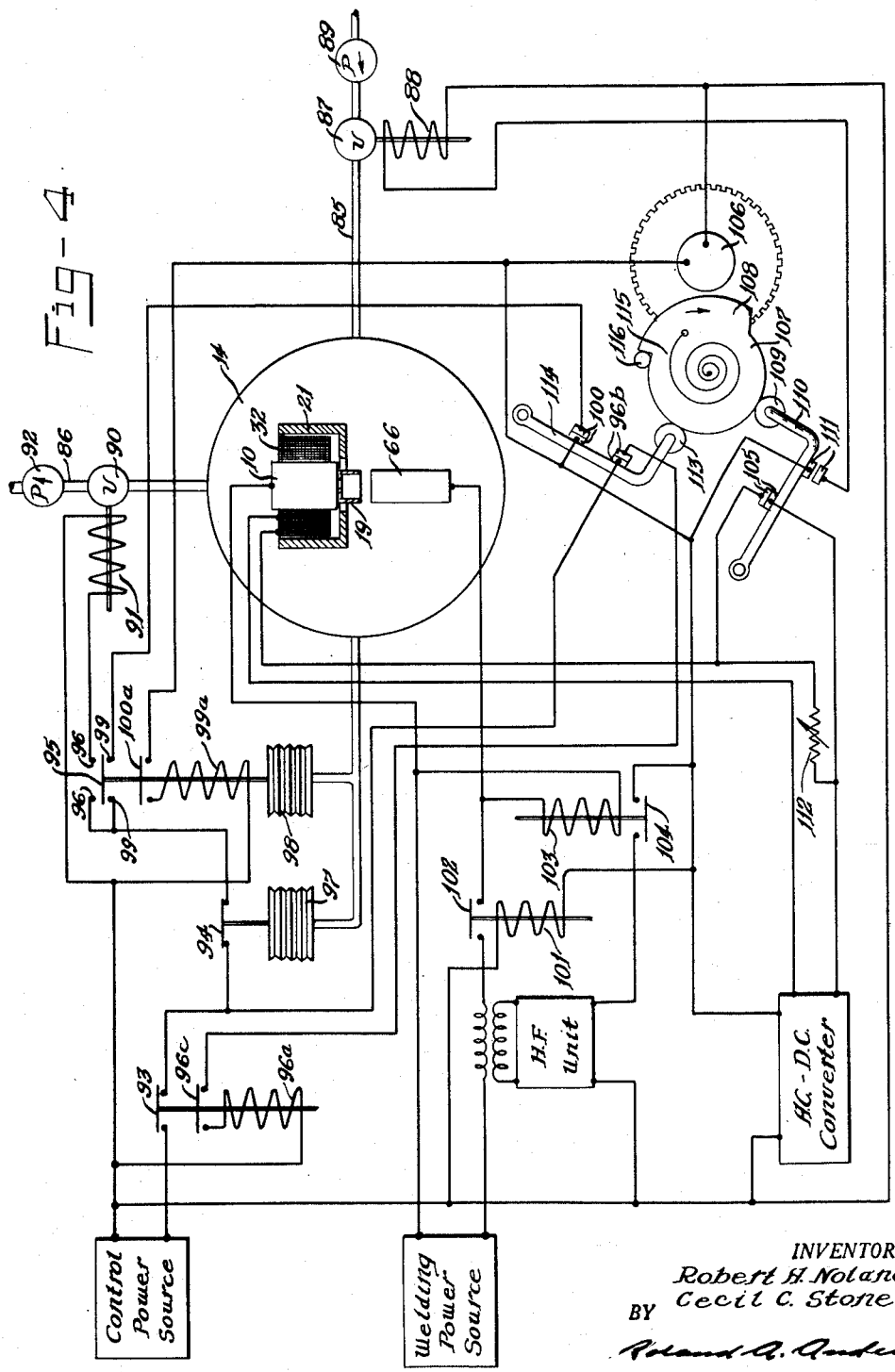

INVENTOR.
Robert H. Noland
BY Cecil C. Stone

Attorney though a spacer 18 of nonmagnetic material such as
United States Patent Office 2,936,363
Patented May 10, 1960

2,936,363
APPARATUS AND METHOD FOR ARC WELDING

Robert A. Noland, Chicago, and Cecil C. Stone, Hinsdale, Ill., assignors to the United States of America as represented by the United States Atomic Energy Commission Application January 27, 1956, Serial No. 561,950

3 Claims. (Cl. 219—123)

This invention relates to a novel apparatus and method for welding and, more particularly, to the formation of welds in a closed or annular path.

The present method and apparatus constitute an improvement over the invention of the copending Lingafelter application Serial No. 561,372, filed January 25, 1956. In that application a welding arc is rotated by a magnetic field very rapidly about an annular electrode so that a weld is produced simultaneously over all points of an annular or closed path.

The present application provides an improvement in the means for creating the magnetic field for rotating the welding arc, as well as an arrangement for controlling the pressure of the atmosphere in which the welding is performed, whereby outgassing from the article being welded is minimized.

The present method and apparatus are particularly useful in welding shut a container for an object, for example, an aluminum jacket for a nuclear-fuel slug. When a jacket is welded shut by rotation of an electric arc at very high speed about the jacket in accordance with the teachings of the said Lingafelter application, any outgassing from the jacket due to welding heat will tend to occur through the weld as it is being produced, since the weld is produced simultaneously at all points. The present invention inhibits outgassing from the jacket being welded by adjusting the pressure throughout the welding cycle to establish a balance between the gas pressure within the jacket and that of the atmosphere surrounding the jacket.

The present invention also involves an improved control of the magnetic field producing rotation of the welding arc, whereby this rotation is prevented from splashing about the metal being welded as the welding arc makes it molten.

In the drawings:

Fig. 1 is a vertical sectional view through the novel welding apparatus of the present invention;

Fig. 2 is a plan view, partly in section, of the welding apparatus;

Fig. 3 is a sectional view of a welding electrode and associated portions of the welding apparatus;

Fig. 4 is a diagrammatic view showing how the welding apparatus is operated and controlled.

Figure 5:
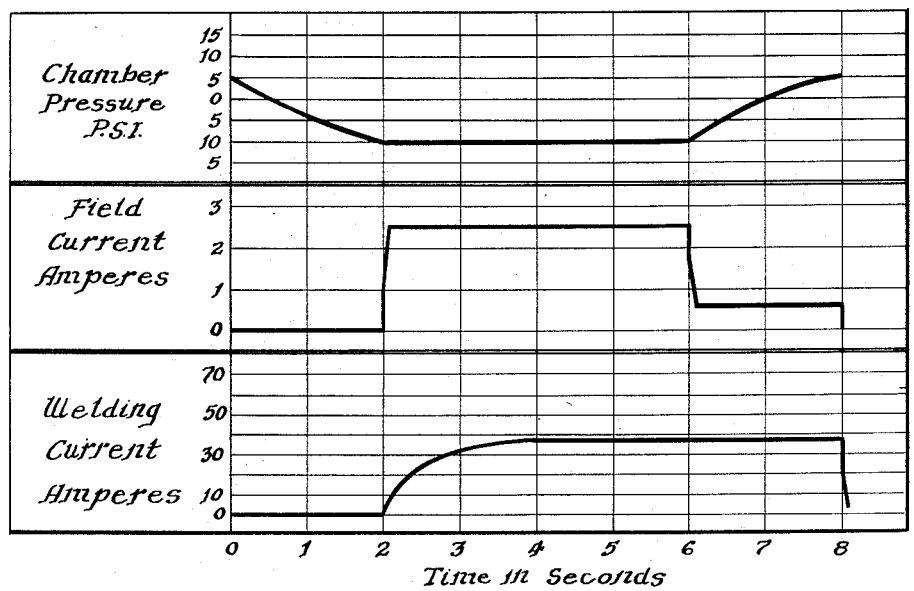
Fig. 5 is a graphical representation of pressures and currents employed in a typical welding cycle used in the present invention.

The novel welding apparatus of the present invention includes a core 10 of a magnetic metal such as soft iron. The core 10 fits in a copper sleeve 11 which has its upper end secured to the core 10 as by silver brazing as indicated at 12. The core 10 extends through a Pyrex glass plate 13 and is supported thereon by a flange 13a. The plate 13 is supported on the top plate 13b of a housing 14 and closes an opening 15 therein.

The lower end of the core 10 receives in a threaded connection the large end of an adapter nipple 16 formed of a magnetic material such as soft iron. The large end of the nipple also has a threaded connection with a washer 17 of nonmagnetic material such as brass which is secured as by soldering or welding to the lower end of the core 10 and to the lower end of the sleeve 11 in which it is set. The small end of the nipple 16 goes through a spacer 18 of nonmagnetic material such as brass and has a threaded connection with an annular welding electrode 19 formed of a suitable refractory material such as molybdenum, tungsten, or graphite.

The spacer 18 rests upon the interior of a base 20 of a magnetic concentrator 21 having the shape of a cup and being formed of a magnetic material such as soft iron. The spacer 18 is positioned in the counterbore of a central opening 22 in the cup base 21 so that the core 10 and the welding electrode 19 are held concentric with the opening 22 and spaced from the cup base 20.

A spool 23 of a nonmagnetic material such as brass is positioned in the cup 21 so that a lower end 24 of the spool 23 is secured above and in spaced relation to the cup base 20 by means of screws 25 and spacing washers 26. A tubular shank 27 of the spool 23 closely fits the exterior of the sleeve 11, and an upper end 28 of the spool has a collar 29 through which set screws 30 are threaded against the sleeve 11. The inner sides of the ends 24 and 28 and the exterior of the tubular shank 27 of the spool 23 are coated with suitable layers 31 of insulating material such as polystyrene. A coil 32 of insulated wire is wound on the spool 23 and has most of its length within walls 33 of the cup, only the portions of the coil 32 adjacent the upper end 28 of the spool 23 projecting beyond the cup walls 33. Current is supplied to the coil through a plurality of posts 33a secured to and extending through the plate 13 in gas-tight connections.

The upper portion of the core 10 has two longitudinal passages 34 and 35 which may be formed by drilling from above and thereafter closed at their upper ends by soft-iron plugs 36 which are attached as by soldering or welding. Inlet line 37 and outlet line 38 are attached to the core 10 at the upper portions of the passages 34 and 35, respectively. The passages 34 and 35 are connected, respectively, with two spiral passages 39 and 40 which are formed between the interior of the sleeve 11 and two exterior spiral grooves on the core 10 extending from the lower ends of the passages 34 and 35 to the lower end of the core. The lower ends of the passages 39 and 40 open into an annular space 41 formed between the washer 17 and the lower ends of the core 10 and the sleeve 11. Fig. 1 shows the lower end of the spiral passage 39 opening into the annular space 41. In operation of the apparatus of the present invention, a coolant such as water enters the core 10 from the inlet line 37, flows successively through the longitudinal passage 34, the spiral passage 39, the annular space 41, the spiral passage 40, the longitudinal passage 35, and exits from the core 10 through the outlet line 38.

The core 10 is clamped through its flange 13a to the Pyrex plate 13 by a neoprene ring 42, stainless-steel rings 43 and 44, and screws 45. The ring 44 has threaded engagement with the core 10 below the plate 13, and the screws 45 have threaded engagement with the ring 44 and push the ring 43 against the ring 42, which in turn is pressed against the Pyrex plate 13. The core 10 has a relatively good fit with the opening in the plate 13 through which it extends, but sealing at this opening is provided by the neoprene ring 42 and a neoprene O-ring 45a positioned in a groove in the flange 13a of the core 10. The flange 13a provides support on the plate 13 for the complete assembly of core 10, electrode 19, concentrator cup 21, coil 32, and spool 23. The opening 15 in the top of the housing 14 is sealed by the plate 13 with the help of a neoprene O-ring 46 set in the top plate 13b of the housing, a neoprene ring 47 on top of the plate 13, and a stainless-steel ring 48 acting against the ring 47, and screw 49 extending through the ring 48 into engagement with top plate 13b.

Welding current is supplied to the electrode 19 through the core 10 from a conductor 50 which is connected to the upper end of the core 10 by being clamped between a ring 51 and a nut 52. The ring 51 is wedged against conical surfaces on the plugs 36 and adjacent portions of the core 10, and the nut 52 has threaded engagement with the upper end of the core 10.

The core 10 has a longitudinal central opening 53 through which a special gas such as chlorine or argon may be supplied from a line 54 which is connected to the upper end of the core 10. The special gas exits from the lower end of the core through a longitudinal central opening 55 in the adapter 16 into the welding electrode 19 and is adapted to improve the quality of the welding arc.

The housing 14 is formed of stainless steel and includes, in addition to the top plate 13b, a tubular body member 56, a bottom plate 57, and a plurality of supporting legs 58 extending downwardly therefrom and secured thereto as by welding. The tubular member 56 is secured to the top plate 13b and the bottom plate 57 as by welding. The bottom plate 57 has an opening 59 which is closed by a disk 60 which is secured to the bottom plate 57 by a ring 61, threaded members 62 passing through the ring 61 and having threaded engagement with the bottom plate 57, and nuts 63 on the threaded members 62. A neoprene ring 64, positioned in an annular groove in the bottom plate 57, seals the opening 59.

A slotted collet 65, which may be formed of brass or bronze, is secured to the disk 60 as by soldering or welding and is adapted to support an assembly 66 to be welded, which may, as shown in Fig. 3, comprise a slug or core 66a of nuclear fuel, an aluminum can 66b, and an aluminum end closure 66c resting in the open end of the can against the slug. An Invar collar 67 rests on the upper end of the collet 65 and embraces the portion of the assembly 66 adjacent its upper end. A ring 68 which is formed of a ceramic such as a fired magnesium silicate surmounts the collar 67 and surrounds the assembly 66.

The housing 14 is provided with two Pyrex viewing windows 69 and 70 which are spaced from one another about 90° about the housing so that the effects of parallax are minimized. The window 69 is clamped by rings 71 and 72 between seals 73. Screws 74 hold the rings 71 and 72 together. The ring 71 is secured by soldering or welding to a short tubular section 75, which is in turn soldered or welded to the tubular body member 56 of the housing 14. The window 70 is clamped by rings 76 and 77 between seals 78. The ring 76 is secured by soldering or welding to a short tubular section 79, which is soldered or welded to the tubular body member 56. The ring 77 is pivotally mounted at one side by a strap 80 on the ring 76, and at the other side a bolt 81 and a nut 82 therein releasably clamp the ring 77, seals 78, and window 70 to the ring 76 so that access to the interior of the housing 14 may be had at this region. The bolt 81 is pivotally mounted on the ring 76 so as to be moved in and out of notches 83 and 84 on the rings 76 and 77. An inlet line 85 and an exhaust line 86 are secured to the tubular body member 56 of the housing 14 and serve, respectively, to supply an inert gas such as argon or argon and helium to the housing and to exhaust the housing of air and other gases.

As shown in Fig. 4, the inlet line 85 is provided with a valve 87, which is opened when a solenoid 88 is energized by an electric current. When the valve 87 is open, a pump 89, connected to the line 85, supplies the housing 14 with argon or a mixture of helium and argon. The exhaust line 86 is provided with a valve 90 which is open when current flows through a solenoid 91. When the valve 90 is open, a vacuum pump 92, connected to the line 86, reduces the gas pressure in the housing 14.

In operation, a welding arc is struck between the welding electrode 19 and the upper end of the assembly 66. There is a radial field set up between the core 10 and the concentrator cup 21 across its opening 22 because of the flow of current through the coil 32, which field causes the arc to move at a very high speed around the welding electrode 19. The welding arc, following the ring shape of the welding electrode, creates a weld between the edge of the aluminum end closure and the open end of the aluminum can of the assembly 66, which weld is of annular shape. The movement of the welding arc about the welding electrode follows the right-hand rule of electricity, according to which the current of the welding arc flows axially between the welding electrode 19 and the assembly 66, the magnetic field set up by the coil 32, the core 10, and the concentrator cup 21 acts radially and thus at right angles to the flow of welding current, and consequently the welding arc is propelled at right angles to the axial direction of the welding current and at right angles to the radial field, or in other words, tangentially of the welding electrode.

The actual welding cycle is like that depicted in Fig. 5 and is caused to occur by virtue of the control apparatus shown in Fig. 4. According to Fig. 5, the pressure in the housing 14 is to be lowered to about −5 lbs. gage from atmospheric or +5 lbs. gage, depending on whether the housing 14 is opened to atmosphere for the insertion of a new assembly 66 to be welded or a plurality of assemblies 66 are successively welded in the housing 14. When the pressure in the housing 14 reaches −5 lbs. gage (and it is anticipated that this may occur in about two seconds with the present apparatus), the welding arc is struck and current starts to flow through the field coil 32. For four seconds the pressure of the housing 14 is maintained at −5 lbs. gage, and the field current is maintained at some relatively high value such as 2.5 amperes. At this time, since it is presumed that the assembly 66 will have become molten at the outer region where the arc has been directed, the field current is reduced at once to some relatively low value such as 0.5 ampere and the pressure in the chamber 14 is increased in a period of two seconds from −5 lbs. gage to +5 lbs. gage. Thereupon, both welding current and field current are cut off.

Since the metal being welded becomes molten and can splash outward under the influence of the rotating welding arc, the field current, which causes rotation of the welding arc, is reduced at some convenient time in the six-second welding cycle such as at the elapse of four seconds. As the assembly 66 being welded heats up during the course of the welding cycle, the gases trapped in the assembly 66 also heat up and tend to escape at the portions being welded because of increase in pressure due to heating. To prevent the outgassing of trapped gases through the weld, which outgassing will seriously reduce the quality of the weld, the pressure of the gas in the housing 14 outside of the assembly 66 being welded is increased to balance the increase in pressure of the trapped gases. It is convenient to start this increase in pressure of the welding atmosphere at the elapse of four seconds in the six-second welding cycle and to double this pressure. It is more practical to double this pressure by the use of −5 lbs. gage and +5 lbs. gage than to use pressures of one and two atmospheres, for in the first case doubling is achieved with 10 and 20 lbs. absolute, in contrast with 15 and 30 lbs. absolute in the second case.

Direct welding current is employed and the assembly 66 being welded is made negative, so that ions move away from the assembly 66, thus automatically cleaning aluminum oxide from the assembly, which would tend to interfere with welding.

The Invar collar 67, positioned about the upper portion of assembly 66 during welding, is particularly useful when the aluminum can being welded is very thin, for the ring, by chilling and supporting the aluminum can, prevents sagging of the can wall due to the heat of welding. The collar 67, being of Invar and thus not expanding as the aluminum can expands, gives the can very good support and helps to prevent the escape of entrapped gases. The ceramic ring 68, positioned on the Invar collar 67, prevents preferential arcing across the Invar ring.

When an assembly 66 is being loaded through the opening 59 in the bottom plate 57 of the housing 14, the appropriate gas for the welding atmosphere may be flowed through the inlet line 85 so that less time will be consumed in purging the housing 14 before a welding cycle.

As shown in Fig. 4, the welding cycle is initiated by closing of a switch 93, so that current flows from the source of control power, which preferably supplies alternating current, through closed switch 94 and a switch 95 closed across contacts 96 to the solenoid 91 which opens the valve 90 and connects the housing 14 to the vacuum pump. Once closed, the switch 93 stays closed because of energization of a solenoid 96a due to closing a circuit that includes cam-controlled contacts 96b and a switch 96c moved with the switch 93. Switch 94 is closed at this time, because it is controlled by a pressure-responsive element 97, which is connected to the housing 14 and is adapted to open the switch 94 only when the pressure in the housing 14 reaches some dangerously high value. Switch 95 is closed across contacts 96, because it is controlled by a pressure-sensitive element 98 connected to the housing 14 so as to pull the switch away from the contacts 96 when the pressure in the housing 14 reaches a certain predetermined low pressure such as −5 lbs. gage, illustrated in Fig. 5.

When this predetermined low pressure is reached, the element 98 snaps the switch 95 from contacts 96 to contacts 99, where the switch 95 is held, because a solenoid 99a is energized through closing of a circuit including cam-operated contacts 100 and a switch 100a movable with the switch 95. The result of moving the switch 95 from the contacts 96 is to deenergize the solenoid 91, whereupon the valve 90 is closed, preventing further reduction of pressure in the housing 14. The result of establishing contact between the switch 95 and the contacts 99 is to close a circuit through contacts 100 and a solenoid 101, which is now energized by the voltage of the control-power source and thus closes a switch 102. Closing of switch 102 applies the voltage of the welding source across the welding electrode 19 and the assembly 66 to be welded and across a solenoid 103. The resulting energization of the solenoid 103 closes a switch 104 so that the high-frequency unit is connected with the source of control power through the closed contacts 100 and through switch 95 and contacts 99. Thus a high-frequency voltage is imposed across the welding electrode 19 and the assembly 66, initiating a welding arc thereacross. The welding arc lowers the voltage across the electrode 19 and the assembly 66 and across the solenoid 103 so that the switch 104 opens and disconnects the high-frequency unit. At the same time a circuit is closed through the A.C.-D.C. converter, which brings current of relatively high value to the field coil 32 through closed contacts 105. Now the welding arc moves around the welding electrode 19 under the influence of the radial field through the concentrator cup 21.

At the same time current flows to a motor 106 which drives a cam 107 in the direction indicated. After four seconds a lobe 108 on the cam reaches a roller follower 109, causing an arm 110 carrying the follower to open the contacts 105 and to close contacts 111, one of each set of contacts 105 and 111 being connected to the arm 110. The result of opening the contacts 105 is that the field current must now flow through a variable resistance 112 and so is appreciably reduced. The result of closing contacts 111 is that current now flows through the solenoid 88 which opens the valve 87 and the pump 89 is connected to the housing 14 to increase the pressure of the gas therein.

When six seconds have elapsed, the cam 107 has rotated far enough to bring the lobe 108 of the cam to a roller follower 113 which is carried by an arm 114 on which one of each of the pairs of contacts 96b and 100 is mounted. Riding of the roller follower 113 on the cam lobe 108 causes opening of contacts 100, which produces a number of results. The solenoid 88 is no longer energized, and the valve 87 is closed shutting off the housing 14 from supply of gas by the pump 89. The solenoid 101 is no longer energized, and the switch 102 is opened, cutting off the welding arc between the welding electrode 19 and the assembly. The A.C.-D.C. converter is cut off from the source of control power, and so the current to the field coil 32 is cut off. The solenoid 99a is no longer energized, and the super-atmospheric pressure in the housing 14 causes the pressure-sensitive element 98 to move the switch 95 away from the contacts 99. Riding of the roller follower 113 on the cam lobe 108 causes opening of contacts 96b, and so the solenoid 96a is deenergized, permitting the manual switch 93 to snap back to starting position.

After driving of the motor 106 is interrupted by opening of the contacts 100, the motor and the cam are rotated backwards under the action of a spring 115 until one end of the cam lobe 108 engages a stop 116. The spring 115, which has its inner end fixed and its outer end connected to the cam 107, was wound up in the rotation of the cam in the direction of the arrow, and so the unwinding force in the spring is utilized to reverse the rotation of the motor 106 and the cam.

In the embodiment illustrated, the annular electrode 19, the concentrator opening 22, and the assembly 66 are circular, and the weld produced on the assembly 66 is circular in outline. However, it is to be understood that the weld may have some other outline, for example, a noncircular curved shape such as an ellipse or a non-curved shape such as a regular or irregular polygon. The annular electrode 19 will have the shape desired on the annular weld, and it may be desirable to modify the shape of the concentrator opening 22 to conform to or to approach the modified shape of the annular electrode for facilitating the formation of the modified weld outline. The important thing is that the weld be produced in a closed or annular path.

The intention is to limit the invention only within the scope of the appended claims.

What is claimed is:

1. A welding machine comprising a magnetic cup having a central opening in its base, a magnetic core extending from the central opening in alignment therewith within the cup and out of contact therewith, an annular welding electrode attached to one end of the core so as to be positioned in the central opening out of contact with the cup and to extend no more than a small amount beyond the exterior of the base of the cup, and a field coil surrounding the core and lying within the cup.

2. The welding machine specified in claim 1 and further comprising a pressurizable housing enclosing the cup, core, electrode, coil and workpiece, whereby the pressure of the welding atmosphere in the housing may be below atmospheric at the start of the welding process and may be above atmospheric at the end of the welding process.

3. An apparatus for creating an annular weld between an end closure and the open end of a can containing a fuel slug, said apparatus comprising an annular welding electrode, means for striking a welding arc between the electrode and the edge of the end closure, a gastight enclosure for the electrode and the assembly of fuel slug, can, and end closure, means for supplying a nonoxidizing gas to the enclosure at a pressure below atmospheric, means for rotating the arc about the edge of the end closure by applying a radial magnetic field transversely across the arc, means for increasing the pressure of the nonoxidizing gas to above atmospheric as the edge of the end closure and the open end of the can become hot, and means for simultaneously reducing the strength of the radial magnetic field.

References Cited in the file of this patent

UNITED STATES PATENTS

| | | |
|---|---|---|
| 510,777 | Coffin | Dec. 12, 1893 |
| 515,652 | Coffin | Feb. 27, 1894 |
| 1,711,151 | Lincoln | Apr. 30, 1929 |
| 1,906,496 | Stine et al. | May 2, 1933 |
| 2,028,780 | Ito | Jan. 28, 1936 |
| 2,743,342 | Bettis | Apr. 24, 1956 |